Patented July 11, 1933

1,917,323

UNITED STATES PATENT OFFICE

MATHIAS PIER, OF HEIDELBERG, AND RUDOLF WIETZEL AND KARL WINKLER, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PRODUCING OXYGENATED ORGANIC COMPOUNDS

No Drawing. Original application filed February 6, 1925, Serial No. 7,391, and in Germany February 7, 1924. Divided and this application filed February 14, 1929. Serial No. 340,011.

This invention relates to improvements in the production of oxygenated organic compounds from oxides of carbon and hydrogen. This is a divisional application relating to subject matter, which has been divided out from our copending application for patent Serial No. 7,391, filed Feb. 6, 1925.

It has been suggested elsewhere to produce methanol or other oxygenated organic compounds catalytically by the interaction of oxides of carbon and hydrogen, and it has been stated that the capacity of the contact masses for producing oxygenated compounds is strongly interfered with or even reduced to nought by the presence of iron in the said contact masses. Besides, it has been recommended to exclude iron or compounds thereof also from the gases, which are to be brought into reaction and from the contact vessel and other parts of the apparatus.

We have now found that catalysts, comprising iron or cobalt in the state of an alloy or compound which is hereinafter referred to as "combined state", for example an oxide, may be employed with great advantage for the production of oxygenated organic compounds from mixtures containing an oxide of carbon and hydrogen if the said catalysts comprise one or more suitable solid elements, other than carbon, capable of existing as such in a non-metallic form, such as for example silicon, boron, sulphur, phosphorus, arsenic and the like or substances capable of existing in a non-metallic form such as, antimony or bismuth, if desired in conjunction with one or more suitable metals such as for example manganese, chromium, tungsten, zinc or the like. Wherever iron is hereinafter mentioned, it is understood that cobalt may be employed in place thereof. It has been found that particularly good results are obtained if the said catalysts also contain a difficultly reducible oxygen compound for example an oxide of chromium, vanadium, tungsten, zirconium, aluminium, titanium or others, which are capable of forming mixed crystals with the said compounds of iron. The high catalytic activity of the catalysts according to the present invention is due to the fact that the iron contained therein is combined with another element or compound. Such combination must be stable under the conditions of working so as to prevent free iron metal being formed either by reduction or decomposition. It may be either a chemical, or a physical one. Thus it is for example necessary that such catalysts contain the iron saturated or even supersaturated with the dissolved or compounded element. Thus an iron alloy must consist of mixed crystals only with no free iron crystals. In accordance with our invention, the catalysts consisting of iron and a sufficient amount of sulphur, phosphorus, arsenic or other solid elements, other than carbon, capable of existing as such in a non-metallic form, give rise to ample quantities of oxygenated organic compounds such as alcohols, ketones, acids, esters and the like, whereas a catalyst containing free iron does not allow of organic compounds containing oxygen being produced in any substantial amount from mixtures of carbon oxide and hydrogen, but only methane and water and at the same time a deposit of carbon. The efficiency of the catalyst above-mentioned is further improved by the addition of an alkali or other alkali metal compounds. It should, however, be noted that copper and silver when employed alone, are not capable of sufficiently reducing the injurious properties of the iron metals; when the said elements are employed, it is therefore necessary that other elements are also present in the catalyst. In many cases, the nature of the products will be more or less different as compared with those produced with catalysts free from the said iron metals, for example higher alcohols, ketones, acids and the like are formed in the present case in larger amounts.

The process according to the present invention is carried out at temperatures between 320° and 500° C. and preferably under pressures of between 200 and 800 atmospheres.

Generally it is advisable in order to keep the said catalysts active for a long period of time, to cause them always to contain a certain amount of combined oxygen, and a small addition of oxygen may be made to the gases for this purpose, or part or even all of the hydrogen may be replaced by water vapor or steam. Hydrocarbons, for example methane, may also be present in addition to or instead of part or all of the hydrogen. Accordingly water vapor or steam, or hydrocarbons are equivalents of hydrogen for the purpose of the invention. With an increased percentage of carbon monoxide the formation of higher molecular products is generally increased and the formation of water lowered, whereas with a preponderating volume of hydrogen the relative production of methanol is increased. In the present case also, the gases to be subjected to the reaction must be free from iron carbonyl which would be decomposed by the catalysts and produce a coating thereon of free metallic iron which would give rise to undesirable reactions. Such an iron coated catalyst would however be made effective again by binding the said free iron for example with sulphur or arsenic. Also care must be taken to avoid a formation of volatile compounds of the iron metals by a contact of the gases with surfaces of free iron metals, in the apparatus, by lining the latter with, or making it of, suitable non-ferrous metals such as copper, aluminium, silver, manganese, chromium or others, or of suitable iron alloy, such as steel V2 A of the firm of Krupp, or iron combined or saturated, at least superficially with sulphur, arsenic or other elements mentioned above, when however attention must be given to the fact that sulphur or some other elements would be extracted by the action of the reducing gases at high temperatures, say about 400° C.

The following example is given in order to illustrate the new process more fully, the parts being by weight unless otherwise stated.

*Example*

A contact mass containing 60 parts of zinc oxide and 30 parts of chromium oxide which is very suitable for producing methanol from carbon monoxide and hydrogen, is greatly injured by an addition of 10 parts of free iron oxide. It would yield practically exclusively water and hydrocarbons while a heavy deposition of carbon takes place. If, however, 5 parts of sulphur are further added to the mass, it produces when a mixture of carbon monoxide and hydrogen is passed over it at 400 degrees centigrade and 200 atmospheres, ample quantities of methanol and higher molecular products. A similar action is exerted by other metalloids such as for example tellurium, phosphorus, arsenic or other metalloids related thereto, such as tin, antimony, bismuth or the like.

What we claim is:—

1. In the conversion of oxides of carbon into oxygenated organic compounds, the step which comprises acting on a mixture containing an oxide of carbon and hydrogen, at a temperature between 320° and 500° C. and under a pressure between 200 and 800 atmospheres with a catalytic mass comprising iron in a combined state and a solid element, other than carbon, capable of existing as such in a non-metallic form.

2. In the conversion of oxides of carbon into oxygenated organic compounds, the step which comprises acting on a mixture containing an oxide of carbon and hydrogen, at a temperature between 320° and 500° C. and under a pressure between 200 and 800 atmospheres with a catalytic mass comprising iron in a combined state, a difficultly reducible solid oxide and an element of the group consisting of silicon, boron, sulfur, phosphorus, arsenic, antimony and bismuth.

3. In the conversion of oxides of carbon into oxygenated organic compounds, the step which comprises acting on a mixture containing an oxide of carbon and hydrogen, at a temperature between 320° and 500° C. and under a pressure between 200 and 800 atmospheres with a catalytic mass comprising iron in a combined state and a solid element, selected from the group consisting of silicon and boron.

4. In the conversion of oxides of carbon into oxygenated organic compounds, the step which comprises acting on a mixture containing an oxide of carbon and hydrogen, at a temperature between 320° and 500° C. and under a pressure between 200 and 800 atmospheres with a catalytic mass comprising iron oxide and a solid element, other than carbon, capable of existing as such in a non-metallic form.

5. In the conversion of oxides of carbon into oxygenated organic compounds, the step which comprises acting on a mixture containing an oxide of carbon and hydrogen, at a temperature between 320° and 500° C. and under a pressure between 200 and 800 atmospheres with a catalytic mass comprising iron oxide, chromium oxide and sulphur.

6. In the conversion of oxides of carbon into oxygenated organic compounds, the step which comprises acting on a mixture containing an oxide of carbon and hydrogen, at a temperature between 320° and 500° C. and under a pressure between 200 and 800 atmospheres with a catalytic mass comprising iron oxide, zinc oxide, chromium oxide and sulphur.

7. In the conversion of oxides of carbon into oxygenated organic compounds, the step which comprises acting on a mixture containing an oxide of carbon and hydrogen, at a temperature between 320° and 500° C. and under a pressure between 200 and 800 atmospheres with a catalytic mass comprising iron in a combined state and sulphur.

8. In the conversion of oxides of carbon into oxygenated organic compounds, the step which comprises acting on a mixture containing an oxide of carbon and hydrogen, at a temperature between 320 and 500° C. and under a pressure between 200 and 800 atmospheres with a catalytic mass comprising iron in a combined state and an element selected from the group consisting of phosphorus and antimony.

In testimony whereof, we affix our signatures.

RUDOLF WEITZEL.
KARL WINKLER.
MATHIAS PIER.